Patented Jan. 17, 1939

2,144,578

UNITED STATES PATENT OFFICE 2,144,578

PROCESS FOR PRODUCING FAST DYEINGS ON THE FIBER

Enrico Pool and Gérald Bonhôte, Basel, and Carl Apotheker, Riehen, near Basel, Switzerland, assignors to the firm Society of Chemical Industry in Basle, Basel, Switzerland No Drawing. Application July 10, 1937, Serial No. 153,054. In Switzerland July 12, 1934

10 Claims. (Cl. 8—71)

The present application is a continuation in part of our copending application Serial No. 30,164, filed July 6, 1935.

Various processes are known for the production of topical dyeings on the fiber by making thereon insoluble azo-dyestuffs. Very good results are obtained, for example, by grounding the whole fabric with the coupling component and applying the diazo-compound only at certain places, or by printing locally with mixture of coupling component and anti-diazo-compound or diazo-amino-compound and then formating the azo-dyestuff by a suitable treatment. All these processes have the common feature that the diazo-compound or the product which contains the diazo-compound ready made, such as the anti-diazotate or the diazo-amino-compound, is produced by treatment of the diazotizable base with nitrous acid not on the fiber but in a separate operation, in absence of the coupling component. It has not been possible hitherto, without an essential impoverishment of the result in respect of depth and beauty of the coloring, to simplify the production of topical dyeings of azo-dyestuffs on the fiber by printing diazo-component and coupling component together on the fiber and then forming the dyestuff by causing nitrous acid to act on the mixture of coupling component or diazo component.

The present invention relates to an improvement of a process in which the mixture consisting of such a diazotizable solid primary amine of melting point not lying below 50° C. and little volatile which in the absence of mineral acid is completely diazotizable in acetic acid of 80 per cent. strength without forming diazoamino compounds and without nitrozation, and alkali salt of a coupling component or a mixture of a coupling component and caustic alkali (neither the primary amine nor the coupling component containing sulfo groups or hydroxyl groups), and alkali nitrite is applied to the fiber and then, by passage of the fiber through acid, while avoiding high temperature (preferably at a temperature that does not exceed 25° C.), the amine is first diazotized and then, by a passage, preferably at a raised temperature, i. e. between 30 and 80° C., best between 40 and 60° C., through an acid binding agent as a second operation the coupling is produced; in this manner dyeings are obtained which are incomparably finer than those obtainable by the hitherto known methods on the fiber in which the diazotization of the diazo-component in the presence of the coupling component, and are equal not only to the dyeings obtained with the aid of preparations of diazo-aminocompounds or of nitrosamine, but also those obtained by direct printing of the diazo-compound on the goods prepared with the coupling component.

In practicing the aforesaid process it has been found advantageous to add to the printing color formaldehyde in order to obtain a good development of the tint. The present invention attains the same object by substituting for the coupling component in the mixture the formaldehyde condensation product of the component, particularly the formaldehyde condensation product of the arylides of 2:3-hydroxynaphthoic acid. Such condensation products are described, for example, in Berichte, volume 61, part I, page 998, line 12. The printing colors containing the condensation products show remarkable permanence.

A great number of diazotizing bases which may be used for carrying out the present invention are illustrated in the examples and in the table to follow. Among the diazotizing bases which come into consideration for the new process those are particularly useful which contain two aromatic nuclei linked by bridges, such as diaryl ethers, azo-compounds, monoacyl derivatives of aromatic diamines containing in the acyl radical an aromatic nucleus. Among the coupling components the formaldehyde condensation products of the arylides of hydroxycarboxylic acid are particularly valuable, and among these again those of the 2:3-hydroxynaphthoic acid, provided of course that they do neither contain sulfo-groups nor carboxyl-groups.

The production of the dyeings in accordance with the invention may be combined with the production of other dyestuffs, for example with that of Aniline Black, or effects produced by vat-dyestuffs or their leuco-sulfuric acid esters or the like.

The following examples illustrate the invention, the parts being by weight; the relationship between parts by volume and parts by weight being that which exists between the kilogram and the liter:—

*Example 1*

220 parts of 4:4'-dichloro-2-amino-1:1'-diphenyl-ether are thoroughly mixed with 250 parts of the di-sodium salt of the condensation product from formaldehyde and 2:3-hydroxynaphthoic acid-2'-methoxyanilide and 180 parts of sodium nitrite. The printing color is made as follows:—

10 grams of the above preparation are very finely mixed with 3 cc. of sodium hydroxide solution of 34° Bé. and 3 cc. of Turkey red oil, 40 cc. of water, 4 cc. of glycerine and 40 grams of neutral starch tragacanth thickening. The material is printed with this color, dried and passed rapidly through an aqueous hydrochloric acid solution of 2 per cent. strength, pressed and then treated for a short time with an aqueous solution of sodium carbonate or sodium bicarbonate of 3–5 per cent. strength at a temperature lying between 30 and 80° C., preferably between 40 and 60° C., or rinsed with cold water whereby a fast, deep, pure red color is developed. The goods are then rinsed and treated in a boiling soap bath. The printing color is stable for several days.

The condensation product from formaldehyde and 2:3-hydroxynaphthoic acid-2'methoxyanilide may be made as follows:—

30 parts of 2:3-hydroxynaphthoic acid-2'-methoxyanilide are made into a paste with 30 parts by volume of alcohol and 60 parts by volume of sodium hydroxide solution of 34° Bé. while stirring; there are added 30 parts by volume of formaldehyde solution of 40 per cent. strength. After a short time the disodium salt of the new compound separates. The thin magma is mixed with saturated common salt solution and stirred for some time, the disodium salt is then filtered and dried.

The same product may also be made as follows:—

293 parts of 2:3-hydroxynaphthoic acid-2'-methoxyanilide are made into a paste with 532 parts of sodium hydroxide solution of 30 per cent. strength. This fine paste is introduced into 6,000 parts of water whilst stirring at 60–65° C. At 40–45° C. 41.2 parts of formaldehyde solution of 40 per cent. strength are added by drops to the clear solution and the whole is stirred for some hours at the ordinary temperature. Any impurities are now separated by filtration and by cautiously adding sodium chloride to the filtrate the sodium salt of the formaldehyde condensation product is precipitated; it is filtered and dried, whereupon it becomes a green-yellow powder.

*Example 2*

A mixture is prepared from 29.6 parts of 4:4'-di-chloro-5-acetylamino-2-amino-1:1'-diphenyl ether, 30 parts of the disodium salt of the condensation product from formaldehyde and 2:3-hydroxy-naphthoic acid-4'-ethoxyanilide and 19.7 parts of sodium nitrite. A printing color is then prepared as described in Example 1 which contains 8 parts of the above mixture per 100 parts. The printing is conducted as described in Example 1 and the dry goods are passed rapidly through an aqueous hydrochloric solution of 2 per cent. strength containing 50 grams of sodium chloride per liter, they are then pressed and exposed to air for a short time in a chamber containing ammoniacal vapors or are passed through such chamber. They are then developed and after-treated.

There is produced a deep, pure Bordeaux red dyeing; the printing color is stable for several days.

*Example 3*

24.5 parts of 4'-chloro-4-carboethoxy-2-amino-diphenyl-ether are thoroughly mixed with 31.5 parts of the condensation product from formaldehyde and 2:3-hydroxynaphthoic acid-2'-methoxyanilide, 17.2 parts of sodium nitrite, 0.2 part of sodium hydroxide and 1.6 parts of anhydrous sodium acetate. The printing color is made as follows:—

7.5 grams of the above preparation are finely mixed with 7 grams of urea, 3 cc. of Turkey red oil, 3 cc. of sodium hydroxide solution of 34° Bé., 30 cc. of water and 49 grams of neutral starch tragacanth thickening. The further operation is as described in Example 1. Drying at too high a temperature should be avoided. There is obtained a red dyeing.

The dyeing may also be developed by removing the acid by means of water or ammonia.

*Example 4*

There is prepared on the one hand a mixture of 26.3 parts of 4-(2'-methyl)-phenoxy-acetyl-amino-2:5-diethoxy-1-aminobenzene, 26.8 parts of the formaldehyde compound of 2:3-hydroxynaphthoic acid meta-chloranilide, 15.9 parts of sodium nitrite, 0.2 part of sodium hydroxide and 0.8 part of crystallized sodium acetate and on the other hand a mixture of 22.7 parts of 4:4'-dichloro-2-amino-diphenyl ether, 30.2 parts of the formaldehyde compound of 2:3-hydroxynaphthoic acid ortho-anisidide, 18.5 parts of sodium nitrite, 0.2 part of sodium hydroxide and 3.4 parts of crystallized sodium acetate. By careful mixing there is now made a printing color from 80 grams of each of the foregoing preparations with 80 cc. of alcohol or 80 grams of urea, 30 cc. of Turkey red oil, 30 cc. of sodium hydroxide solution of 34° Bé., 340 cc. of water and 440 grams of starch tragacanth thickening. The material is printed with the printing color, dried and passed between two rollers, one of which rotates in a hydrochloric acid of 2 per cent. strength, which may contain a thickening, the arrangement being such that the material comes into contact only with the hydrochloric acid carried forward by the roller. After a short time the goods are then treated with sodium bicarbonate solution of 5 per cent. strength at a temperature lying between 30 and 80° C., preferably between 40 and 60° C., and rinsed with water, they are then treated in a boiling soap bath. There are produced both pure blue and pure red effects.

The following table shows a number of other dyeings which can be produced in accordance with this invention:— compounds and without nitrozation, through an acid for the purpose of producing diazotization,

| Diazo-component | Coupling-component formaldehyde condensation product of— | Color of the combination produced on cotton |
|---|---|---|
| 2-amino-1-methyl-4-nitrobenzene | 2:3-hydroxynaphthoic acid anilide | Scarlet. |
| 1-amino-2-methyl-4-nitrobenzene | 2:3-hydroxynaphthoic acid-2'-methylanilide | Blue red. |
| 4-amino-3:2'-dimethyl-azobenzene | 2:3-hydroxynaphthoic acid-anilide | Bordeaux. |
| 1-amino-2-methoxy-5-chloro-4-benzoylamino-benzene | 2:3-hydroxynaphthoic acid-4'-methoxy-anilide | Red violet. |
| 1-amino-2-methoxy-5-methyl-4-benzoylamino-benzene | 2:3-hydroxynaphthoic acid-anilide | Violet. |
| 1-amino-2:5-diethoxy-4-benzoylaminobenzene | ——do—— | Blue. |
| o-Anisol-azo-α-naphthylamine | ——do—— | Violet black. |
| 1-amino-2-methyl-4-nitrobenzene | 2:3-hydroxycarbazole-carboxylic acid-parachloranilide | Brown. |
| 4:4'-dichloro-2-amino-1:1'-diphenylether | 2:3-hydroxynaphthoic acid-4'-ethoxy-anilide | Scarlet. |
| Do | 2:3-hydroxynaphthoic acid-4'-methoxy-anilide | Red. |
| Do | 2:3-hydroxynaphthoic acid-1'-naphthylamide | Do. |
| Dianisidine | 2:3-hydroxynaphthoic acid-anilide | Blue. |
| Benzidine | 2:3-hydroxynaphthoic acid-2'-methoxyanilide | Garnet. |
| Para-phenylenediamine-azo-2-methoxy-5-methyl-1-aminobenzene | 2:3-hydroxynaphthoic acid-2'-naphthylamide | Black. |
| α-Naphthylamine | 2:3-hydroxynaphthoic acid-1'-naphthylamide | Bordeaux. |
| 2-amino-4-aceto-4:4'-dichloro-diphenylether | 2:3-hydroxynaphthoic acid-2'-methoxy-anilide | Red. |
| 2-amino-5-acetylamino-4:4'-dimethoxy-diphenyl-ether | 2:3-hydroxynaphthoic acid-4'-methoxyanilide | Violet. |
| Aminoazobenzene | 2:3-hydroxynaphthoic acid-anilide | Bordeaux. |
| 4-amino-2:3-dimethyl-azobenzene | 2:3-hydroxynaphthoic acid-3'-nitro-anilide | Garnet. |
| 1-amino-2:5-dimethoxy-4-benzoylaminobenzene | 2:3-hydroxynaphthoic acid-anilide | Blue. |
| 1-amino-2-chloro-5-methoxy-4-benzoyl-aminobenzene | 2:3-hydroxynaphthoic acid-2'-methoxy-anilide | Currant. |
| 4:4'-dichloro-2-amino-diphenylether | Di-(4-methyl-1-hydroxy-2-benzoyl)-dianisidide | Brown. |
| 2-amino-1:5-dimethyl-4-benzoylaminobenzene | 2:3-hydroxynaphthoic acid-2'-methoxy-anilide | Red. |
| 4-amino-3-methoxy-azobenzene | 2:3-hydroxynaphthoic acid-1'-naphthylamide | Garnet. |
| Do | 2:3-hydroxynaphthoic acid-4'-methoxy-anilide | Do. |
| Do | 2:3-hydroxynaphthoic acid-anilide | Do. |
| 4-(4'-methyl)-phenoxy-acetylamino-2:5-diethoxy-1-aminobenzene | ——do—— | Blue. |
| Do | 2:3-hydroxynaphthoic acid-ortho-toluidide | Do. |
| 4-phenoxy-acetylamino-2:5-diethoxy-1-aminobenzene | 2:3-hydroxynaphthoic acid-1'-naphthylamide | Do. |

The process permits production of mixed tints by the use of suitable mixtures of parent material, whether of diazo-components or of coupling components, or both together. It can be applied to the most various textiles, above all to vegetable textiles such as cotton, linen, or ramie, further to artificial silk from regenerated cellulose, natural silk and the like.

What we claim is:—

1. Process for producing fast tints on cellulosic fibers, this term including fibers consisting of natural and of regenerated cellulose, by the action of nitrous acid on the fiber printed with mixtures of coupling components and diazotizable primary amines, both containing neither sulfo-groups nor carboxyl groups, comprising first passing the vegetable fiber printed with a mixture of a formaldehyde condensation product of an arylide of 2:3-hydroxynaphthoic acid prepared in a separate operation previous to the preparation of the printing paste, an alkali, an alkali nitrite and an ortho-aminodiphenyl ether, the melting point of which does not lie below 50° C. and which, in the absence of mineral acid, is completely diazotizable in acetic acid of 80 per cent. strength without forming diazoamino compounds and without nitrozation, through an acid for the purpose of producing diazotization, and then, at temperatures lying between 30 and 80° C., through an agent that binds acid for the purpose of producing coupling.

2. Process for producing fast tints on the vegetable fiber by the action of nitrous acid on the fiber printed with mixtures of coupling components and diazotizable primary amines, both containing neither sulfo-groups nor carboxyl-groups, comprising first passing the vegetable fiber printed with a mixture of a formaldehyde condensation product of an arylide of 2:3-hydroxynaphthoic acid prepared in a separate operation previous to the preparation of the printing paste, an alkali, an alkali nitrite and an ortho-aminodiphenyl ether, the melting point of which does not lie below 50° C. and which, in the absence of mineral acid, is completely diazotizable in acetic acid of 80 per cent. strength without forming diazoamino compounds and without nitrozation, through an acid for the purpose of producing diazotization, and then, at temperatures lying between 30 and 80° C., through an agent that binds acid for the purpose of producing coupling.

3. Process for producing fast tints on cellulosic fibers, this term including fibers consisting of natural and of regenerated cellulose, by the action of nitrous acid on the fiber printed with mixtures of coupling components and diazotizable primary amines, both containing neither sulfo-groups nor carboxyl-groups, comprising first passing the vegetable fiber printed with a mixture of a formaldehyde condensation product of an arylide of 2:3-hydroxynaphthoic acid prepared in a separate operation previous to the preparation of the printing paste, an alkali, an alkali nitrite and an ortho-aminodiphenyl ether, the melting point of which does not lie below 50° C. and which, in the absence of mineral acid, is completely diazotizable in acetic acid of 80 per cent. strength without forming diazoamino compounds and without nitrozation, through an acid for the purpose of producing diazotization, while avoiding temperatures essentially exceeding 25° C., and then, at temperatures lying between 30 and 80° C., through an agent that binds acid for the purpose of producing coupling.

4. Process for producing fast tints on the vegetable fiber by the action of nitrous acid on the fibre printed with mixtures of coupling components and diazotizable primary amines, both containing neither sulfo-groups nor carboxyl-groups, comprising first passing the vegetable fiber printed with a mixture of a formaldehyde condensation product of an arylide of 2:3-hydroxynaphthoic acid prepared in a separate operation previous to the preparation of the printing paste, an alkali, an alkali nitrite and an ortho-aminodiphenyl ether, the melting point of which does not lie below 50° C. and which, in the absence of mineral acid, is completely diazotizable in acetic acid of 80 per cent. strength without forming diazoamino compounds and without nitrozation, through an acid for the purpose of producing diazotization, while avoiding temperatures essentially exceeding 25° C., and then, at temperatures lying between 30 and 80° C., through an agent that binds acid for the purpose of producing coupling.

5. Process for producing fast tints on the vegetable fiber by the action of nitrous acid on the fiber printed with mixtures of coupling components and diazotizable primary amines, both containing neither sulfo-groups nor carboxyl-groups, comprising first passing the vegetable fiber printed with a mixture of a formaldehyde condensation product of an arylide of 2:3-hydroxy-naphthoic acid prepared in a separate operation previous to the preparation of the printing paste, an alkali, an alkali nitrite and a 4-chloro-2-amino-diphenyl-ether, through an acid for the purpose of producing diazotization, and then, at temperatures lying between 30 and 80° C., through an agent that binds acid for the purpose of producing coupling.

6. Process for producing fast tints on the vegetable fiber by the action of nitrous acid on the fiber printed with mixtures of coupling components and diazotizable primary amines, both containing neither sulfo-groups nor carboxyl-groups, comprising first passing the vegetable fiber printed with a mixture of a formaldehyde condensation product of an arylide of 2:3-hydroxynaphthoic acid prepared in a separate operation previous to the preparation of the printing paste, an alkali, an alkali nitrite and a 4-chloro-2-amino-diphenyl-ether, through an acid for the purpose of producing diazotization, while avoiding temperatures essentially exceeding 25° C., and then, at temperatures lying between 30 and 80° C., through an agent that binds acid for the purpose of producing coupling.

7. Process for producing fast tints on the vegetable fiber by the action of nitrous acid on the fiber printed with mixtures of coupling components and diazotizable primary amines, both containing neither sulfo-groups nor carboxyl-groups, comprising first passing the vegetable fiber printed with a mixture of a formaldehyde condensation product of an arylide of 2:3-hydroxynaphthoic acid prepared in a separate operation previous to the preparation of the printing paste, an alkali, an alkali nitrite and 4:4'-dichloro-2-amino-diphenyl-ether, through an acid for the purpose of producing diazotization, and then, at temperatures lying between 30 and 80° C., through an agent that binds acid for the purpose of producing coupling.

8. Process for producing fast tints on the vegetable fiber by the action of nitrous acid on the fiber printed with mixtures of coupling components and diazotizable primary amines, both containing neither sulfo-groups nor carboxyl-groups, comprising first passing the vegetable fiber printed with a mixture of a formaldehyde condensation product of an arylide of 2:3-hydroxynaphthoic acid prepared in a separate operation previous to the preparation of the printing paste, an alkali, an alkali nitrite and 4:4'-dichloro-2-amino-diphenyl-ether, through an acid for the purpose of producing diazotization, while avoiding temperatures essentially exceeding 25° C., and then, at temperatures lying between 30 and 80° C., through an agent that binds acid for the purpose of producing coupling.

9. Process for producing fast tints on the vegetable fiber by the action of nitrous acid on the fiber printed with mixtures of coupling components and diazotizable primary amines, both containing neither sulfo-groups nor carboxyl-groups, comprising first passing the vegetable fiber printed with a mixture of a formaldehyde condensation product of the ortho-anisidide of 2:3-hydroxynaphthoic acid prepared in a separate operation previous to the preparation of the printing paste, an alkali, an alkali nitrite and 4:4'-dichloro-2-amino-diphenyl-ether, through an acid for the purpose of producing diazotization, and then, at temperatures lying between 30 and 80° C., through an agent that binds acid for the purpose of producing coupling.

10. Process for producing fast tints on the vegetable fiber by the action of nitrous acid on the fiber printed with mixtures of coupling components and diazotizable primary amines, both containing neither sulfo-groups nor carboxyl-groups, comprising first passing the vegetable fiber printed with a mixture of a formaldehyde condensation product of the ortho-anisidide of 2:3-hydroxynaphthoic acid prepared in a separate operation previous to the preparation of the printing paste, an alkali, an alkali nitrite and 4:4'-dichloro-2-amino-diphenyl-ether, through an acid for the purpose of producing diazotization, while avoiding temperatures essentially exceeding 25° C., and then, at temperatures lying between 30 and 80° C., through an agent that binds acid for the purpose of producing coupling.

ENRICO POOL.
GÉRALD BONHÔTE.
CARL APOTHEKER.